United States Patent
Faye

[11] Patent Number: 6,105,705
[45] Date of Patent: Aug. 22, 2000

[54] METHOD AND DEVICE FOR CONTROLLING A MOTOR VEHICLE BRAKE SYSTEM

[75] Inventor: Ian Faye, Stuttgart, Germany

[73] Assignee: Robert Bosch GmbH, Stuttgart, Germany

[21] Appl. No.: 09/203,975

[22] Filed: Dec. 2, 1998

[30] Foreign Application Priority Data

Dec. 5, 1997 [DE] Germany ............................ 197 53 971

[51] Int. Cl.⁷ ................................................... B60K 28/10
[52] U.S. Cl. ............................................................ 180/275
[58] Field of Search .................................... 180/275, 232, 180/271; 293/2, 4, 5, 8; 303/193; 188/353

[56] References Cited

U.S. PATENT DOCUMENTS

| | | | |
|---|---|---|---|
| 3,744,855 | 7/1973 | Ochiai ................................ | 303/21 BE |
| 4,146,108 | 3/1979 | Sato ................................... | 180/103 BF |
| 4,964,485 | 10/1990 | Miele ................................. | 180/275 |
| 5,286,099 | 2/1994 | Fujita et al. ...................... | 303/103 |
| 5,575,542 | 11/1996 | Tanaka et al. ..................... | 303/125 |
| 6,017,101 | 1/2000 | Matsuda ............................ | 303/140 |

FOREIGN PATENT DOCUMENTS 1 95 24 939   1/1997   Germany .

OTHER PUBLICATIONS

W. Jonner et al., "Electrohydraulic Brake System—The First Approach to Brake–By–Wire Technology," Society of Automotive Engineers Technical Paper Series, Paper No. 960991, International Congress & Exposition, Detroit, Michigan, Feb. 26–29, 1996, pp. 105–12.

*Primary Examiner*—Brian L. Johnson
*Assistant Examiner*—Gerald Klebe
*Attorney, Agent, or Firm*—Kenyon & Kenyon

[57] ABSTRACT

A method and a device for controlling the brake system of a vehicle, in which, when a collision situation is identified, braking force beyond the driver's intent is built up, preferably up to a maximum value.

14 Claims, 3 Drawing Sheets

METHOD AND DEVICE FOR CONTROLLING A MOTOR VEHICLE BRAKE SYSTEM

FIELD OF THE INVENTION

The present invention relates to a method and a device for controlling a brake system of a vehicle.

BACKGROUND INFORMATION

Modern brake systems exert braking force on the wheels of a vehicle through electrical actuation, at least in some operating states. In certain operating states this braking force is greater than and independent of the driver's command. Such a, brake system, is then electrohydraulic brake system described in W. Jonner et al., "Electrohydraulic Brake System—The First Approach to Brake-By-Wire Technology," Society of Automotive Engineers, Paper No. 960991, 1996, pp. 105–12. In this brake system, electrical control signals are formed for the hydraulic actuators assigned to the individual wheel brakes as a function of the driver's intent detected by electrical means, or a brake system with traction control or vehicle dynamics control, in which, under certain conditions, an automatic braking sequence is initiated and braking force is built up on the wheel brakes independently of the brake pedal actuation by the driver (e.g., German Patent No. 195 24 939). A hill holder function, in which, under certain predefined operating conditions, braking force is also applied independently of the driver, can be considered an extension of such a brake system. Furthermore, electropneumatic brake systems and brake systems with electromechanical brake application are known.

With such brake systems, satisfactory control of the braking sequence, its limit ranges and/or satisfactory stabilization of the vehicle, is achieved. At standstill, the vehicle is held by the brake actuated by the driver (except for vehicles with hill holder). The braking force needed for standstill is usually less than that applied during the braking sequence, since no kinetic energy needs to be counteracted. Holding compensation is only required the force driving the vehicle down a, slope. Thus, in a collision accident, in particular at standstill and from behind, the vehicle can be displaced despite brake actuation. This is critical, especially when the vehicle is pushed into a danger zone (for example, when stopping for a traffic light at a crossing).

SUMMARY OF THE INVENTION

The object of the present invention is to provide measures allowing the vehicle to be held at standstill even in collisions with another vehicle or to be quickly brought to a standstill again.

By initiating automatic braking with a very high braking force applied to the wheel brakes (e.g., full braking) in the case of a collision, it is ensured that the vehicle remains at standstill or is brought back to a standstill very quickly.

It is particularly advantageous that the damage caused by an accident and the danger of additional accidents are reduced or even prevented.

It is particularly advantageous that this measure can be taken when the driver's intention to keep the vehicle at standstill is recognized. Thus, such braking is only initiated if the driver basically counts on it and it meets the driver's expectations.

In other exemplary embodiments, it can be advantageous to initiate braking in the case of a collision if the driver does not wish to start or accelerate the vehicle. Thus those cases where the driver holds the vehicle at a standstill without actuating the brakes are also included.

It is particularly advantageous that in implementing the present invention, existing systems and signals can be utilized. Thus, the collision is detected using a vehicle acceleration signal or an accident information signal, both from an air bag controller, for example, or from wheel rotation speed signals or pedal actuation signals.

DETAILED DESCRIPTION OF THE INVENTION

Figure 1:
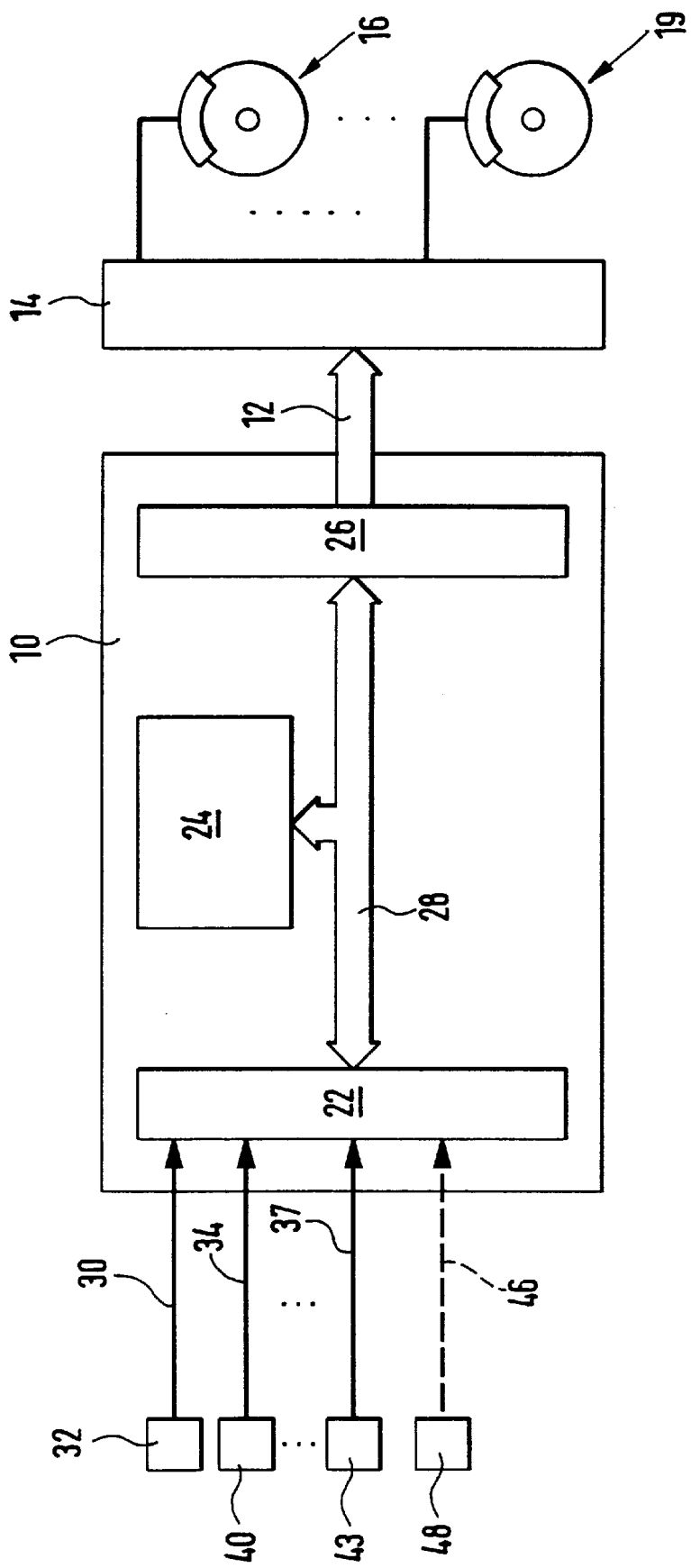
FIG. 1 shows a controller for controlling a brake system.

FIG. 1 shows an electronic controller 10, which controls an electrically actuated brake system 14, designed according to the related art described above, e.g., via control lines 12. The individual wheel brakes 16 through 19 are connected to brake system 14.

Controller 10 contains an input circuit 22, at least one microcomputer 24, and an output circuit 26. Furthermore, there is a memory (not illustrated), where vehicle-specific parameters such as the vehicle weight are stored. These elements are interconnected via a communication system 28 for bidirectional data exchange. Control lines 12 originate at output circuit 26, while at least input line 30 from a measuring device 32, which detects pedal actuation by the driver, and input lines 34 through 37 for wheel rotation speed signals from the respective measuring devices 40 through 43, go to input circuit 22. In one exemplary embodiment, an input line 46, through which a signal representing vehicle acceleration or a signal representing an accident is transmitted from an air bag controller 48, is also provided.

Pedal actuation is detected, in the simplest case, by a brake pedal, BLS switch, which changes its switching state when the brake is actuated. In other exemplary embodiments, the actuation force, the actuation path, etc., are advantageously determined and a corresponding signal is sent to controller 10. In addition to brake pedal actuation, this signal also includes, in the exemplary embodiment, the actuation of a parking brake via a suitable hand or foot lever. In the exemplary embodiment, controller 10 performs the power brake functions known from the related art, through which braking force can be built up automatically to full braking in the case of a panic situation, brake assignment. In other exemplary embodiments, controller 10 is a control unit of an electrohydraulic or electropneumatic or electromechanical brake system. In another exemplary embodiment, controller 10 performs traction control and/or driving dynamics control with a hill holder function optionally built in.

One common feature of all these systems is that a braking force that is greater than that defined by the driver can be generated in the wheel brakes. According to the present invention, a very high braking force (e.g., full braking) can be initiated on the wheel brakes via controller 10, if a collision, in particular from behind, is detected. This is based on an unusually high acceleration (greater than a predefined threshold value) of the vehicle, derived from a suitable signal from the air bag and/or from wheel rotation speed signals and/or panicky actuation or release of the brake pedal at standstill. In addition or as an alternative, accident type information is transmitted from an air bag controller, which is used for detecting an accident.

In the exemplary embodiment, high braking force is only built up in a stopped vehicle. A stopped vehicle is recognized in the exemplary embodiment by a very low speed, which is below a predefined threshold value. An additional condition, in one embodiment, is that the driver actuates the brake pedal and/or the parking brake.

In another exemplary embodiment, the high braking force is initiated even at higher speeds, so that the vehicle is automatically braked in the event of an accident at a higher speed. In one embodiment, the requirement that the brake pedal be actuated can be omitted, and automatic braking can be initiated if no intention of the driver to move the vehicle, e.g., by actuating the gas pedal, exists when a collision is detected.

Figure 2:
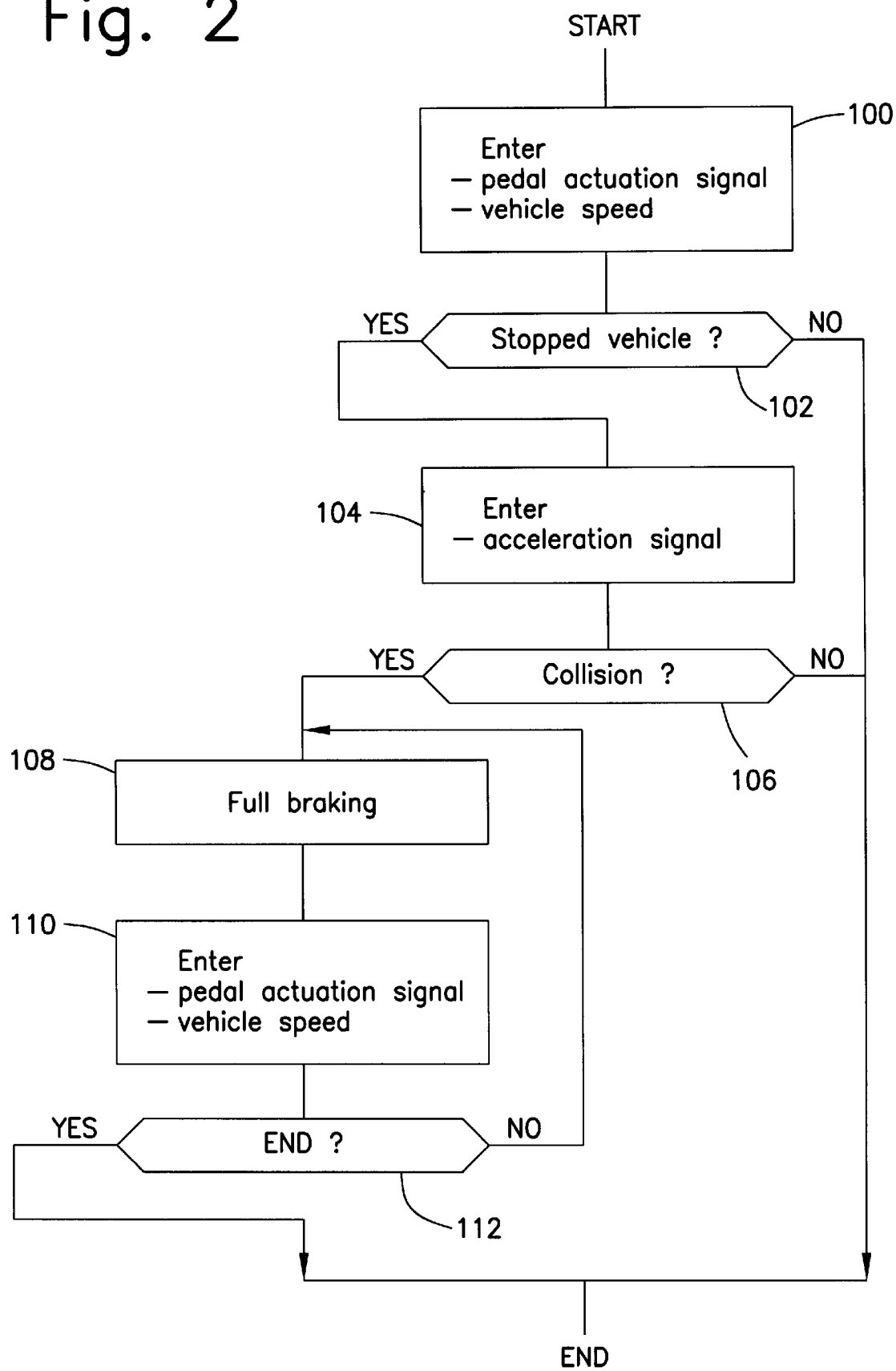
FIG. 2 shows a preferred exemplary embodiment of the brake system control during and after a collision.
Figure 3A:
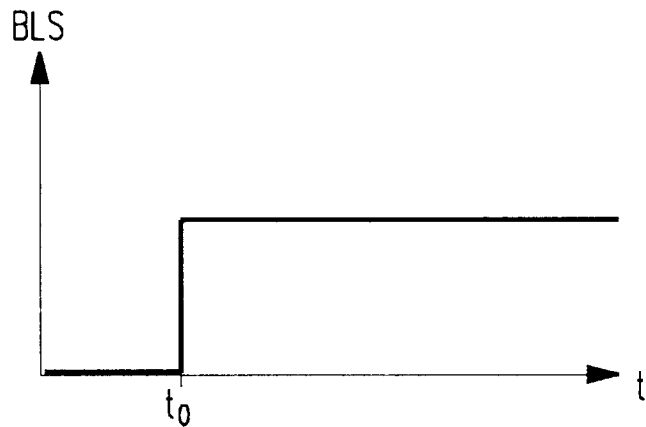
FIG. 3a shows a variation of a brake pedal switching signal BLS over time.
Figure 3B:
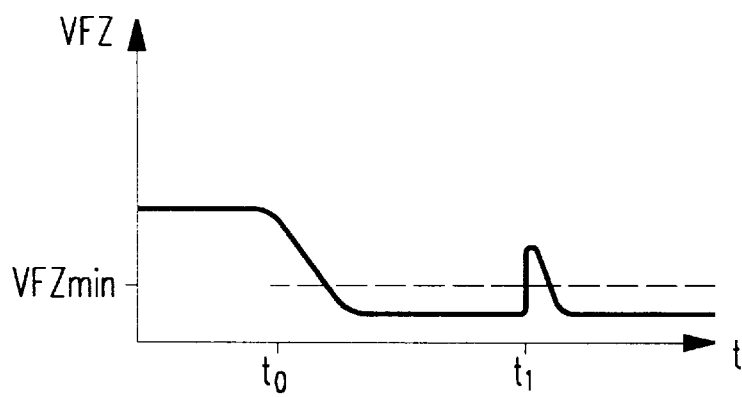
FIG. 3b shows another variation of the vehicle speed, VFZ.
Figure 3C:
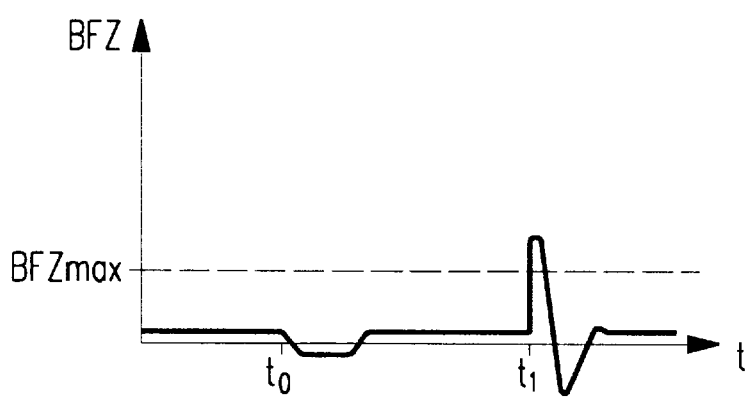
FIG. 3c shows yet another variation of the acceleration signal BFZ over time.
Figure 3D:
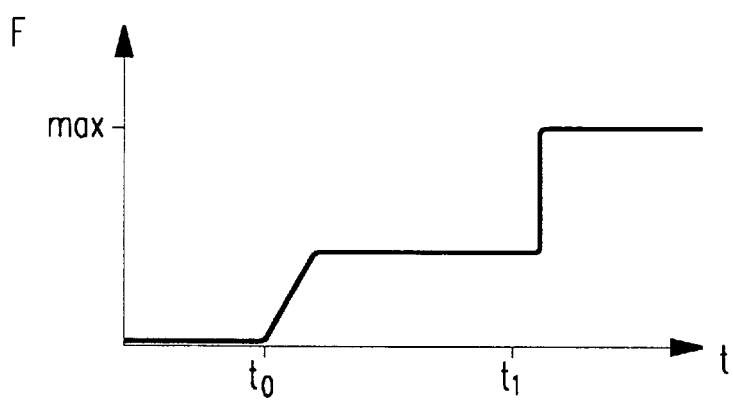
FIG. 3d shows a further variation of the braking force, Fbrems, over time.

FIG. 2 shows a preferred exemplary embodiment as a flow chart. This flow chart represents a program implemented in microcomputer 24 of controller 10. The program represented by the flow chart is run at predefined points in time.

In first step 100, the pedal actuation signal, is detected using for example, the signal of a brake light switch, the pedal path, the pedal force, the pressure pedal-position-dependent-in part of the brake system and/or the actuation of a parking brake. The vehicle speed is also detected. It is obtained either from a dedicated sensor or, in a conventional manner, from the wheel rotation speed signals. In subsequent step 102, it is verified whether conditions exist for performing the automatic braking sequence. In the exemplary embodiment, this is the case when the vehicle is stopped, i.e., when the vehicle speed is less than a minimum limit value (e.g., 10 km/h). If the vehicle speed is less than this limit value, the vehicle is at considered to be a standstill; otherwise, the vehicle is classified as moving. In addition to the condition of a stopped vehicle, it is verified in this embodiment whether the brake pedal and/or the parking brake has been actuated. If either of these two conditions is not met, the program is ended and is then run again starting with step 100.

If these conditions are met, in the exemplary embodiment, the acceleration signal transmitted by the air bag controller is entered in subsequent step 104. In the following step 106, this signal is evaluated concerning whether a collision has occurred with another vehicle. Those collisions where the vehicle is hit from behind are of particular interest. This can be determined, e.g., by additionally evaluating the wheel rotation speeds. In addition, in one embodiment, the air bag acceleration signal is not evaluated when an unusually high acceleration of the vehicle is obtained from the wheel rotation speeds, for example using a threshold value query, due to the collision. For this purpose, two consecutive rotation speed signals are compared, and if a threshold value is exceeded, a collision is assumed. A very quick release or actuation of the pedal at standstill may serve as a supplementary criterion for a collision. If no such collision is detected, the program is ended and is then run again starting with step 100.

If a collision is detected in step 106, the braking force applied to the wheel brakes is increased, for example, to its maximum value in step 108, i.e., full braking is initiated. In other exemplary embodiments, this value may also be less than the maximum value. It is then selected so that the vehicle can possibly be kept at standstill or can be brought back to standstill relatively rapidly. After step 108, the pedal actuation signal and the vehicle speed is re-entered in step 110. In the subsequent step 112, it is then checked whether the vehicle no longer moves as a result of the collision. The release of the brake pedal and/or the parking brake by the driver or a vehicle speed can be used as a criterion here. This criterion is also met when the driver actuates the accelerator pedal, for example. If any of these conditions are met, braking force buildup is interrupted and the program is repeated at a given time with step 100. If none of the conditions for ending the automatic braking sequence are met, the program continues at the next instant with step 108, while the built-up braking force is maintained.

In other exemplary embodiments, the following changes with respect to the preferred embodiment are provided.

Step 102 is omitted, so that automatic braking force buildup also takes place in the event of a collision at a higher speed. Furthermore, instead of the condition that the brake pedal must be actuated with the vehicle at a standstill, even non-actuation, e.g., of the accelerator pedal, can be used as a criterion. In this case, the vehicle is assumed to be stopped as long as there is no intent manifested by the driver to move the vehicle.

Instead of the acceleration signal or in addition to it, accident information is transmitted from this controller. It is then used for making a decision on whether a collision has taken place and whether braking force should be built up.

In another exemplary embodiment, the program outlined in FIG. 2 is triggered when a collision has been identified; (step 106) then the program runs from step 108 through 112.

In FIG. 3, the operation is illustrated using a time chart. Assume that the vehicle initially travels with a certain speed. At time T0 the driver actuates the brake pedal; according to FIG. 3a, the brake pedal switch changes its switching state. The driver continues to actuate the brake pedal. After time T0, the vehicle is braked and the vehicle speed drops (see FIG. 3b). It drops below minimum vehicle speed VFZmin, so that if this criterion is present and the brake pedal is actuated, a collision check is performed. FIG. 3c shows the variation of the acceleration signal. It is analyzed for a maximum value BFZmax. Deceleration after time T0 is insufficient to exceed this maximum value. Accordingly, after time T0 the braking force is built up according to the driver's intent, according to FIG. 3d. At time T1 (the vehicle is stopped) a collision occurs. The acceleration signal value exceeds the maximum, so that a collision is identified (see FIG. 3c). This results in maximum braking force buildup at time T1 (see FIG. 3d). The maximum braking force is maintained in the following, since none of the above-mentioned end criteria are met.

The aforementioned signals for collision detection and the criteria for which braking force buildup takes place and is interrupted are used individually or in any desired combination possibly with other signals.

| Captions to FIG. 2 | |
|---|---|
| 100 | Enter<br>pedal actuation signal<br>vehicle speed |
| 102<br>J = Y<br>N = N | Stopped vehicle? |
| 104 | Enter<br>acceleration signal |
| 106 | Collision? |
| 108 | Full braking |
| 110 | Enter<br>pedal actuation signal<br>vehicle speed |
| 112 | End? |

What is claimed is:

1. A method for controlling a brake system of a vehicle, comprising the steps of:
   generating a first braking force on wheel brakes of the vehicle when a driver of the vehicle actuates at least one of a brake pedal and a parking brake; and
   if the vehicle is in a collision with a further vehicle, building up an additional braking force on the wheel brakes of the vehicle, the additional braking force being greater than the first braking force.

2. The method according to claim 1, further comprising the step of:
   detecting the collision as a function of an acceleration signal of an acceleration sensor, the acceleration signal triggering a restraint system.

3. The method according to claim 1, further comprising the step of:
   detecting the collision as a function of a rotation speed of wheels of the vehicle.

4. The method according to claim 1, further comprising the step of:
   detecting the collision as a function of an actuation force of the brake pedal.

5. The method according to claim 1, further comprising the step of:
   detecting the collision as a function of an accident information provided by a controller of a restraint system.

6. The method according to claim 1, wherein the building up step is performed only if a value of a speed of the vehicle is less than a predetermined threshold value.

7. The method according to claim 1, wherein the building up step is performed only if at least one of the brake pedal and the parking brake has been actuated by the driver.

8. The method according to claim 1, wherein the building up step is performed only if the driver did not perform an action to indicate an intent to move the vehicle.

9. The method according to claim 8, wherein the action includes the driver pressing an accelerator pedal.

10. The method according to claim 1, wherein the brake system is one of an electrohydraulic brake system, an electropneumatic brake system and an electromechanical brake system, and wherein the brake system performs at least one of a traction control, a driving dynamics control, a power brake function and a hill holder function.

11. The method according to claim 1, wherein the building up step is performed when the further vehicle collides with a rear portion of the vehicle.

12. The method according to claim 11, wherein the collision between the further vehicle and the rear portion of the vehicle is determined using a rotation speed of the wheels.

13. The method according to claim 1, wherein during the building up step, the additional braking force is equal to a predetermined maximum braking force.

14. A device for controlling a brake system of a vehicle, comprising:
   controller including an arrangement, the arrangement building up an additional braking force if the vehicle is in a collision with a further vehicle, the braking force being greater than an initial braking force, the initial braking force being intentionally initiated by a driver of the vehicle.

* * * * *